(12) United States Patent
Wittig et al.

(10) Patent No.: US 6,922,301 B1
(45) Date of Patent: Jul. 26, 2005

(54) POSITIONER OF A DISK DRIVE THAT POSITIONS A DATA TRANSDUCER WITH REDUCED VIBRATION

(75) Inventors: Larry Wittig, Lexington, MA (US); Stanislaw Dobosz, Shrewsbury, MA (US); Upendra Ummethala, Worcester, MA (US)

(73) Assignee: Maxtor Corporation, Longmont, CO (US)

( * ) Notice: Subject to any disclaimer, the term of this patent is extended or adjusted under 35 U.S.C. 154(b) by 261 days.

(21) Appl. No.: 10/263,222

(22) Filed: Oct. 2, 2002

(51) Int. Cl.[7] ............................................. G11B 21/02
(52) U.S. Cl. ...................... 360/75; 360/77.02; 360/76
(58) Field of Search ..................... 360/75, 76, 77.01, 360/77.02, 97.01, 98.01, 260, 264.3, 264.7, 265; 310/184, 189, 180, 200, 12, 17, 36–39; 318/568.17

(56) References Cited

U.S. PATENT DOCUMENTS

| | | | |
|---|---|---|---|
| 5,267,110 A | | 11/1993 | Ottesen et al. |
| 5,621,591 A | | 4/1997 | Rahimi et al. |
| 5,936,805 A | * | 8/1999 | Imaino ................. 360/294.5 |
| 6,043,957 A | * | 3/2000 | Hattori et al. ........... 360/294.3 |
| 6,088,194 A | * | 7/2000 | Imaino et al. .......... 360/294.3 |
| 6,104,581 A | | 8/2000 | Huang et al. |
| 6,225,712 B1 | * | 5/2001 | Miyamoto et al. ............ 310/15 |
| 6,721,125 B2 | * | 4/2004 | Bryant .................... 360/78.05 |
| 2002/0097519 A1 | | 7/2002 | Chang et al. |

\* cited by examiner

Primary Examiner—David Hudspeth
Assistant Examiner—Jason Olson
(74) Attorney, Agent, or Firm—Steven G. Roeder; James P. Broder

(57) ABSTRACT

A disk drive includes a head stack assembly having a storage disk, a data transducer, an actuator pivot center and a positioner. The positioner includes a magnet assembly, a primary coil array that generates a first rotational displacement of the data transducer, and a secondary coil array that generates a second rotational displacement of the data transducer. The absolute value of the ratio of the first rotational displacement to the second rotational displacement is at least approximately 1.5:1. The primary coil array generates a first vibration displacement that causes the data transducer to move off track, and the secondary coil array generates a second vibration displacement that is out of phase from the first vibration displacement. The absolute value of the sum of the first and second vibration displacements is less than the absolute value of the first vibration displacement. The disk drive can also include a control system that directs a first current to the primary coil array and a second current to the secondary coil array that is out of phase from the first current. The secondary coil array can include a proximal coil and a distal coil, with the proximal coil being positioned closer to the actuator pivot center than the distal coil. Further, only a portion of at least one of the coils is positioned directly between the magnet arrays. In another embodiment, the head stack assembly includes a latitudinal axis that divides the head stack assembly into a positioner region and a transducer region. The secondary coil array is positioned substantially within the positioner region of the head stack assembly. The positioner generates a primary force and a secondary force that combine to generate a constant net force in a direction along the longitudinal axis while the data transducer moves between the inner diameter and the outer diameter.

59 Claims, 6 Drawing Sheets

POSITIONER OF A DISK DRIVE THAT POSITIONS A DATA TRANSDUCER WITH REDUCED VIBRATION

FIELD OF THE INVENTION

The present invention relates generally to a disk drive for storing and retrieving data, and a positioner that moves an actuator assembly of a disk drive.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular regions of different radii, commonly referred to as "tracks". The disk drive includes a head stack assembly having a positioner, an actuator assembly and one or more transducer assemblies. The actuator assembly includes an actuator hub, an actuator pivot center, and one or more actuator arms. Each transducer assembly includes one or more data transducers. The positioner is used to precisely rotate the actuator assembly to position the data transducers relative to one or more storage disks. The data transducer transfers information to and from the storage disk when precisely positioned over an appropriate data track (also referred to as a "target track") of the storage surface.

The need for increased storage capacity and compact construction of the disk drive has led to the use of disks having increased track density, i.e. more tracks per inch. As the track density increases, the ability to maintain the data transducer over the target track becomes more difficult. More specifically, as track density increases, it is necessary to reduce positioning error of the data transducer proportionally. With these systems, the accurate and stable positioning of the data transducer proximate the appropriate track is critical to the accurate transfer and or retrieval of information from the rotating storage disks.

Conventional positioners include a voice coil motor. The voice coil motor works by directing electrical current through a wound wire coil located in a magnetic field. Besides causing the actuator arms and transducer assemblies to move in a desired direction, the same coil forces excite one or more undesirable vibration modes, including for example, a "first vibration mode " and a "second vibration mode". In some drives, the first vibration mode occurs at a frequency of between approximately 5,000 and 7,500 cycles per second and the second vibration mode occurs at a frequency of between approximately 7,500 and 12,000 cycles per second. These vibration modes can cause an undesirable vibration displacement of the data transducer, and can therefore make it more difficult to accurately maintain positioning of the data transducer over the desired track of the storage disk (also known as "track following"). Much of this vibration is caused by the structural response of the actuator assembly to forces in the coil that are used to position the data transducers.

One attempt to increase the level of accuracy in positioning the actuator assembly and the transducer assembly relative to the storage disk includes using a so-called "pure torque " positioner, i.e. generating theoretical forces with one or more coils that are equal but directionally opposite relative to the actuator hub. In theory, the directionally opposite forces reduce excitation of the first vibration mode at the actuator hub. However, this theory assumes that the positioner and the actuator assembly are a purely rigid, completely inflexible body, and the first vibration mode motion is a rigid body translation motion. Unfortunately, because the positioner and the actuator assembly are not completely rigid, the first vibration mode is not satisfactorily inhibited.

Another attempt to increase accuracy of the positioner includes using two coils through which current is directed in opposite directions. The currents are adjusted to generate forces that nearly cancel one another. In order to maintain the data transducer on a particular track, an increased current is directed through one of the coils to move the data transducer toward the center of the data track. However, because this design utilizes two or more relatively large, geometrically similar coils, increased power is required during track following because both coils are used in an offsetting manner. This increased power consumption can increase the cost of using the disk drive and the heat generated within the disk drive.

In light of the above, the need exists to provide a positioner that accurately positions and maintains the data transducer relative to the target track of a storage disk while using relatively low power consumption. A still further need exists to reduce the cost of manufacturing a high-density disk drive.

SUMMARY

The present invention is directed to a disk drive including a drive housing and a head stack assembly having a data transducer, a positioner that is coupled to the data transducer, and a longitudinal axis. In one embodiment, the positioner includes a magnet assembly that generates a magnetic field, a primary coil array that interacts with the magnetic field and generates a first rotational displacement of the data transducer, and a secondary coil array that interacts with the magnetic field and generates a second rotational displacement of the data transducer. In this embodiment, the absolute value of the ratio of the first rotational displacement to the second rotational displacement is at least approximately 1.5:1.

The secondary coil array can include exactly one coil, or greater than one coil. Further, the secondary coil array can be substantially B-shaped. The primary coil array can generate a first vibration displacement that causes the data transducer to move off track, and the secondary coil array generates a second vibration displacement that at least partially counteracts the first vibration displacement. Stated another way, the second vibration displacement can be out of phase from the first vibration displacement , The absolute value of the sum of the first and second vibration displacements can be less than the absolute value of the first vibration displacement.

The disk drive can include a control system that directs a first current to the primary coil array and a second current to the secondary coil array. In this embodiment, the second current can be out of phase from the first current.

In other embodiments, the magnet assembly can include a first magnet array and a spaced apart second magnet array. The secondary coil array can include a first coil segment and a spaced apart second coil segment, with the coil segments being positioned directly between the magnet arrays. Moreover, each magnet array can have an inner edge, and at least one of the coil segments can be shaped substantially similar to at least a portion of the inner and or outer edge of at least one of the magnet arrays. The head stack assembly includes an actuator pivot center, and the first and second coil segments can each form arcs of a circle having a center positioned approximately at the actuator pivot center. Further, the first and second coil segments can be positioned on opposite sides of the longitudinal axis, and can also be substantially symmetrical relative to the longitudinal axis. The secondary coil array can include a first coil and a spaced apart second coil, with the first coil including the first coil segment, and the second coil including the second coil segment. In this embodiment, the secondary coil array can include a proximal coil and or a distal coil, with the proximal coil being positioned closer to the actuator pivot center than the distal coil. Further, only a portion of at least one of the coils is positioned directly between the magnet arrays.

In another embodiment, the head stack assembly includes a latitudinal axis that is perpendicular to the longitudinal axis. The latitudinal axis intersects the longitudinal axis at the actuator pivot center. The latitudinal axis divides the head stack assembly into a positioner region, and a transducer region that includes the data transducer. In this embodiment, the secondary coil array is positioned substantially within the positioner region of the head stack assembly. The disk drive also includes a storage disk having an inner diameter and an outer diameter. The positioner moves the data transducer between the inner diameter and the outer diameter. The primary coil array generates a primary force and the secondary coil array generates a secondary force, with the forces combining to generate a substantially constant net force in a direction that is parallel to the longitudinal axis and or a direction that is perpendicular to the longitudinal axis while the data transducer moves between the inner diameter and the outer diameter.

The present invention is also directed to a method for increasing the accuracy of maintaining a data transducer on track in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
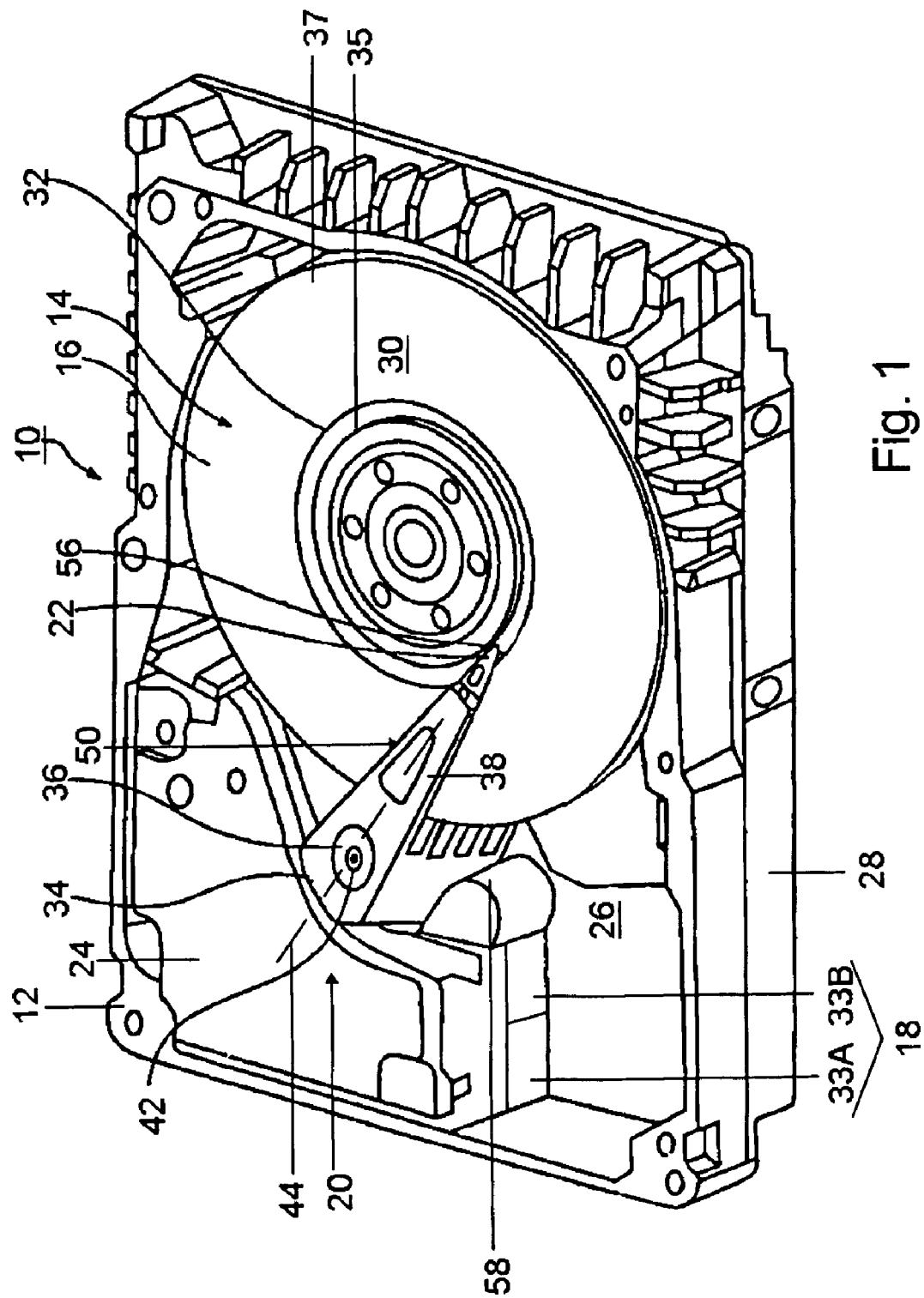
FIG. 1 is a perspective view of a disk drive including a positioner having features of the present invention.

FIG. 1 illustrates a disk drive 10 according to the present invention. The disk drive 10 includes (i) a drive housing 12, (ii) a disk assembly 14 having one or more storage disks 16, (iii) a control system 18, and (iv) a head stack assembly 20 including one or more transducer assemblies 22 and a positioner 24 that precisely positions the transducer assemblies 22 relative to the storage disk(s) 16. The drive housing 12 retains the various components of the disk drive 10. The drive housing 12 includes a base 26 and four side walls 28. A typical drive housing 12 also includes a cover (not shown for clarity) that is spaced apart from the base 26 by the side walls 28.

Each storage disk 16 includes one or more data storage surfaces 30. These storage surfaces 30 include a plurality of data tracks 32 (only one data track 32 is shown in FIG. 1). During track following, one of data tracks 32 is known as the target track 32, as illustrated for representational purposes on the top storage surface 30 of the uppermost storage disk 16. However, any of the data tracks 32 on the storage disks 16 can be the target track 32. Additionally, data is stored on the storage surface 30 between an inner diameter 35 and an outer diameter 37 of the storage disk 16.

The control system 18 directs current to the positioner 24 to move the head stack assembly 20 relative to the storage disks 16. The design of the control system 18 can vary depending upon the requirements of the positioner 24 and the particular disk drive 10. More specifically, the control system 18 can include a plurality of controllers. In the embodiment illustrated in FIG. 1, the control system 18 includes a first controller 33A and a second controller 33B. Each controller 33A, 33B can independently direct current to different portions of the positioner 24, as provided in greater detail below. Alternatively, the control system 18 can include greater or fewer than two controllers 33A, 33B.

The head stack assembly 20 includes an actuator hub 34, one or more actuator arms 38 (only one actuator arm 38 is shown for clarity), and an actuator bearing assembly (not shown). The actuator hub 34 rotates around an actuator shaft 36, which is secured to the base 26 and is positioned at an actuator pivot center 42. The actuator arms 38 are attached to and cantilever from the actuator hub 34.

The head stack assembly 20 has a longitudinal axis 44 (shown in phantom) that extends lengthwise along the actuator arms 38. The actuator arms 38 move with the actuator hub 34 and maintain the transducer assemblies 22 proximate the data storage surfaces 30. Regardless of the number of actuator arms 38 and transducer assemblies 22 in the head stack assembly 20, the actuator hub 34, the actuator shaft 36, the actuator arm(s) 38 and the actuator bearing assembly are collectively referred to herein as an actuator assembly 50.

The transducer assemblies 22 transfer information to and from the storage disks 16. In the embodiments illustrated herein, each transducer assembly 22 includes a load beam, a flexure, and a data transducer 56. The load beam attaches the flexure and, the data transducer 56 to the actuator arm 38. Each flexure is used to attach one of the data transducers 56 to one of the load beams. Each flexure is subsequently attached to a flex circuit 58 that electrically couples the data transducers 56 to the control system 18. For a magnetic storage disk 16, the data transducer 56 can also be referred to as a read write head.

The positioner 24 provided herein positions the actuator assembly 50, and thus the data transducer 56, near the storage surface 30 between the inner diameter 35 and the outer diameter 37 of the storage disk 16 during reading and writing of data.

Figure 2A:
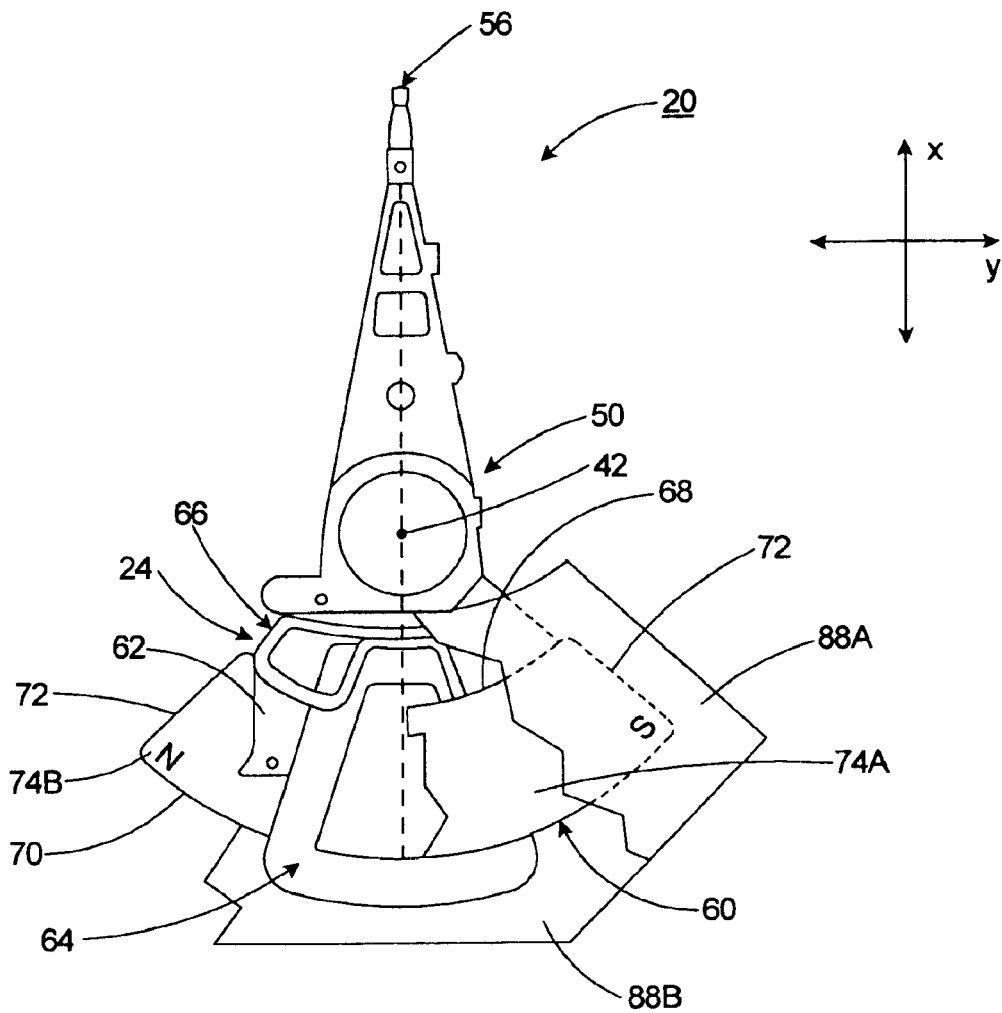
FIG. 2A is a partial cutaway view of a head stack assembly including a portion of a positioner having features of the present invention.

FIG. 2A illustrates a top, partial cutaway view of the head stack assembly 20 including a first embodiment of the positioner 24. The positioner 24 precisely moves and rotates the actuator assembly 50 about the actuator pivot center 42 to position the data transducer 56. The components of positioner 24 can vary depending upon the design requirements of the disk drive 10. In FIG. 2A, the positioner 24 includes a magnet assembly 60, a conductor housing 62, a primary coil array 64 and a secondary coil array 66 that interact to position the actuator assembly 50, and therefore the data transducer 56, with increased accuracy.

In the embodiment illustrated in FIG. 2A, the magnet assembly 60 includes a first magnet array 74A and a second magnet array 74B. Further, each magnet array 74A, 74B is somewhat flat plate shaped and includes an arc-shaped inner edge 68, an arc-shaped outer edge 70, and a pair of spaced-apart radial sides 72. Each magnet array 74A, 74B can be made of a magnetic material such as NdFeB.

The magnet assembly 60 also includes a first flux return plate 88A and a spaced apart, second flux return plate 88B. The flux return plates 88A, 88B, serve as a return path for magnetic fields from the magnet arrays 74A, 74B. Each flux return plate 88A, 88B, is made of a magnetically permeable material such as a soft iron or steel. The flux return plates 88A, 88B, are coupled to the drive housing 12 (illustrated in FIG. 1). Further, the first magnet array 74A can be secured to the first flux return plate 88A, and the second magnet array 74B can be secured to the second flux return plate 88B.

Figure 2B:
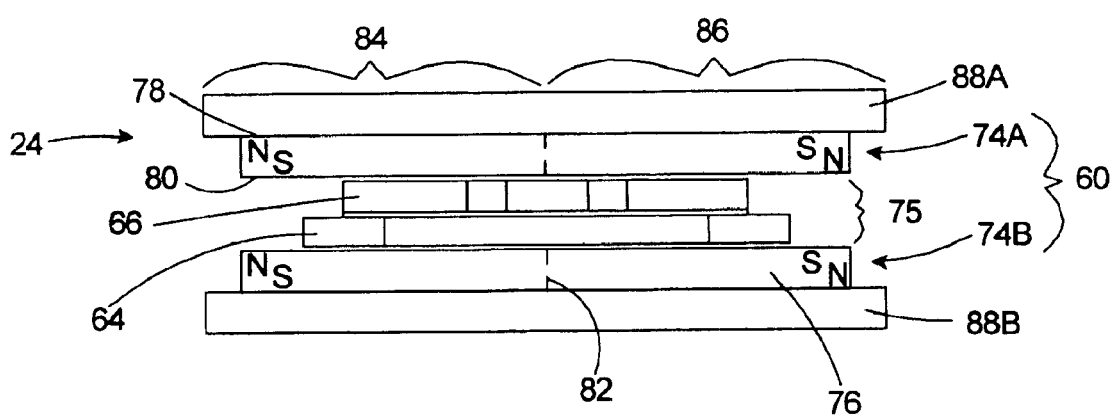
FIG. 2B is a partial end view of the embodiment of the positioner illustrated in FIG. 2A.

FIG. 2B illustrates an end view of a portion of the positioner 24, including the magnet assembly 60, the primary coil array 64 and the secondary coil array 66 of FIG. 2A. The conductor housing 62 has been omitted for clarity. The magnet assembly 60 includes the magnet arrays 74A, 74B, and the flux return plates 88A, 88B. The first magnet array 74A and the second magnet array 74B are spaced apart by a fluid gap 75. Each magnet array 74A, 74B, -includes one or more magnets 76. Alternatively, for example, the positioner 24 could include a single magnet array 74A having a plurality of magnets 76.

The first magnet array 74A includes a substantially flat top surface 78, a spaced apart and a substantially flat bottom surface 80. The second magnet array 74B can have a somewhat similar configuration. Alternatively, each magnet array 74A, 74B can be sized and shaped in another suitable configuration.

A pole transition zone 82 (shown with dashed lines) vertically divides each magnet array 74A, 74B into a first sector 84 and a second sector 86 which are side-by-side. Each of the sectors 84, 86 of each magnet array 74A, 74B has a north pole (indicated with an "N") and a south pole (indicated with an "S"). The poles of the first sector 84 for the first and second magnet arrays 74A, 74B are reversed relative to the poles of the second sector 86 for the first and second magnet arrays 74A, 74B.

At least a portion of the primary coil array 64 and a portion of the secondary coil array 66 are positioned in the fluid gap 75 between the magnet arrays 74A, 74B. In FIG. 2B, the coil arrays 64, 66 are positioned in substantially parallel planes, e.g. the coil arrays 64, 66 are not coplanar, and the primary coil array 64 is positioned below the secondary coil array 66. Alternately, the positioning of the coil arrays 64, 66 can be varied. For example, the primary coil array 64 could be positioned above the secondary coil array 66, the secondary coil array 66 can be positioned above and or below the primary coil array 64, or the primary coil array 64 and the secondary coil array 66 can be coplanar.

Figure 2C:
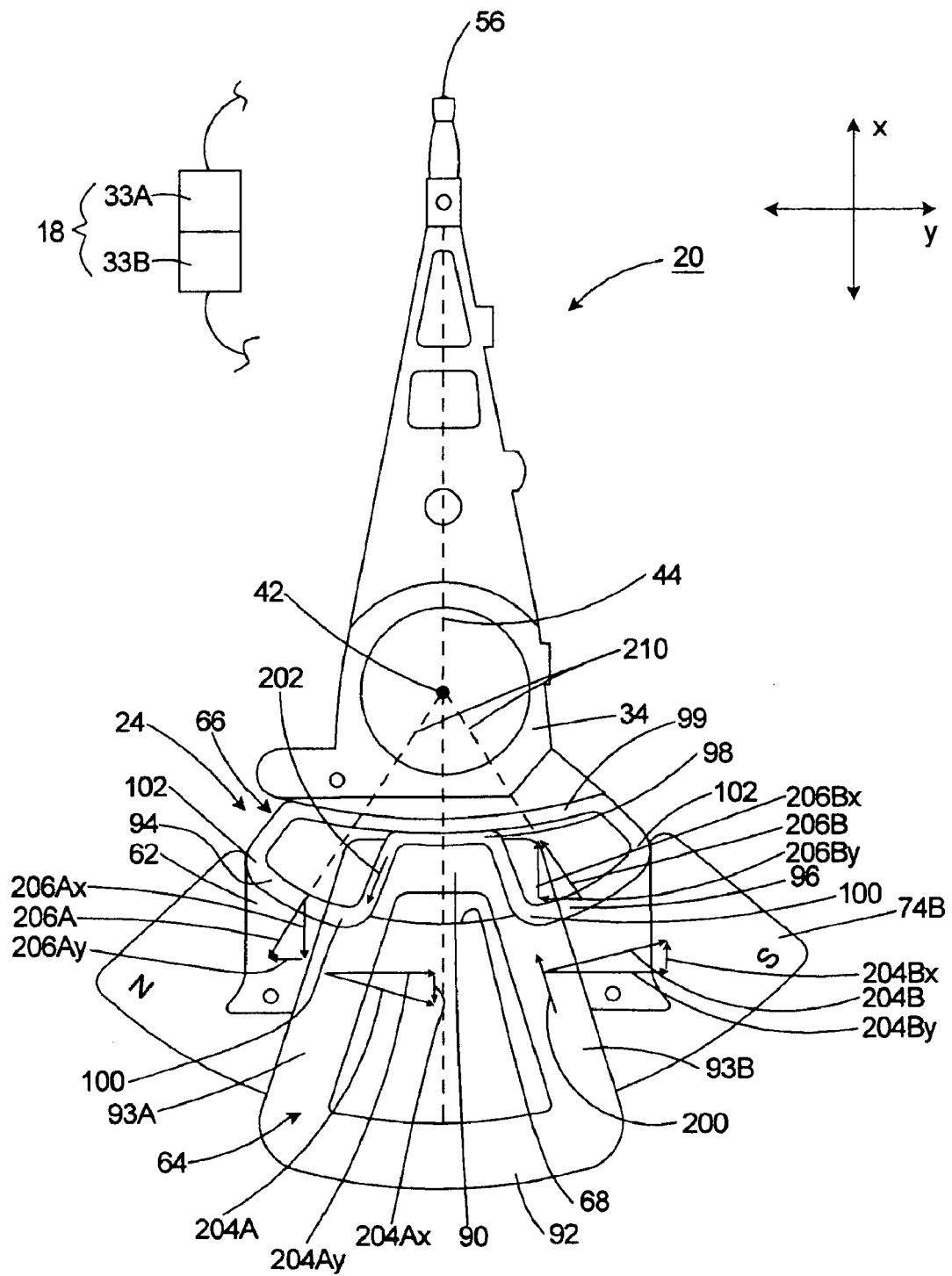
FIG. 2C is a top view of a portion of the embodiment of the head stack assembly illustrated in FIG. 2A.

FIG. 2C illustrates a top view of the head stack assembly 20 including the positioner 24 of FIG. 2A. The first flux return plate 88A and the first magnet array 74A have been omitted for clarity. As illustrated in FIG. 2C, the conductor housing 62 secures and couples the primary coil array 64 and the secondary coil array 66 to the actuator hub 34. The conductor housing 62 can be a separate component from the actuator hub 34 or the conductor housing 62 can be formed as an integral part of the actuator hub 34.

In FIG. 2C, the primary coil array 64 is a single, generally trapezoidal-shaped coil that includes a plurality of conductive wires (not shown). In this embodiment, the primary coil array 64 includes a substantially linear proximal side 90, an arc-shaped distal side 92, a first side leg 93A and a second side leg 93B. The side legs 93A, 93B connect the proximal side 90 to the distal side 92. In this embodiment, the majority of each side leg 93A, 93B is positioned directly between the magnet arrays 74A, 74B. However, alternative configurations of the primary coil array 64 can be utilized.

The design of the secondary coil array 66 can vary to suit the design requirements of the disk drive 10. As illustrated in FIG. 2C, the secondary coil array 66 can include a single coil that is somewhat B-shaped. The secondary coil array 66 includes a first coil segment 94 that is substantially arc-shaped, a second coil segment 96 that is substantially arc-shaped, a first connector segment 98 that is somewhat C-shaped, and a second connector segment 99 that is somewhat C-shaped. Although the positioning of the coil segments 94, 96 can vary, FIG. 2C illustrates that the first coil segment 94 and the second coil segment 96 are positioned approximately symmetrically about the longitudinal axis 44 of the head stack assembly 20. Further, the first coil segment 94 and the second coil segment 96 can generally follow a contour of the inner edge 68 of the magnet assembly 60, although this positioning is not essential.

In this embodiment, the first and second coil segments 94, 96 each form arcs of a circle (not shown) that is centered approximately at the actuator pivot center 42. Each coil segment 94, 96 has an inner end 100 and an outer end 102. The inner end 100 is positioned closer to the longitudinal axis 44 of the head stack assembly 20 than the outer end 102. Further, the secondary coil array 66 can include more or less than the two arc-shaped coil segments 94, 96.

The shape and size of the connector segments 98, 99 can vary. In the embodiment illustrated in FIG. 2C, the first connector segment 98 connects the inner end 100 of the first coil segment 94 to the inner end 100 of the second coil segment 96. The second connector segment 99 connects the outer end 102 of the first coil segment 94 to the outer end 102 of the second coil segment 96. Additionally, the secondary coil array 66 can include more or less than the two connector segments 98, 99.

The coil segments 94, 96 of the secondary coil array 66 are positioned directly between the first magnet array 74A and the second magnet array 74B, thereby enhancing interaction between the coil segments 94, 96 and the magnet assembly 60. Moreover, the coil segments 94, 96 can remain substantially between the magnet arrays 74A, 74B during positioning of the data transducer 56 between the inner diameter 35 and outer diameter 37 of the storage disk 16 (illustrated in FIG. 1). Further, in various embodiments, the coil segments 94, 96 do not cross the pole transition zone 82 during positioning of the data transducer 56 between the inner diameter 35 and the outer diameter 37 of the storage disk 16. This design, in conjunction with the configuration of the secondary coil array 66 provided herein, promotes a consistent electromagnetic force (described in greater detail below) on either side of the longitudinal axis 44 of the head stack assembly 20 throughout the stroke of the positioner 24 during track following or settling operations of the disk drive 10.

In the embodiment illustrated in FIG. 2C, the connector segments 98, 99 are not positioned between the first magnet array 74A and the second magnet array 74B. Thus, the connector segments 98, 99 are effectively positioned substantially outside of the magnetic fields of the magnet arrays 74A, 74B.

FIG. 2C also illustrates the control system 18 including the first controller 33A and the second controller 33B. The control system 18 independently directs current to the primary coil array 64 and the secondary coil array 66. For example, the first controller 33A can direct a first current 200 (illustrated as an arrow) to the primary coil array 64, and the second controller 33B can direct a second current 202 (illustrated as an arrow) to the secondary coil array 66.

The first current 200 in the primary coil array 64 generates a first primary force 204A (illustrated as an arrow) between the energized first side leg 93A of the primary coil array 64 and the magnet assembly 60, and a second primary force 204B (illustrated as an arrow) between the energized second side leg 93B of the primary coil array 64 and the magnet assembly 60. The sum of the first primary force 204A and the second primary force 204B is the net primary force (not shown). The magnitude and direction of the first and second primary forces 204A, 204B, and thus the net primary force, depends upon the shape of the primary coil array 64, the design of the magnet assembly 60 and the amplitude, direction and frequency of the first current 200 that is directed through the primary coil array 64. It is recognized that the amplitude, direction and frequency of the first current 200 can be adjusted as required to produce the desired magnitude and direction of the net primary force.

In this embodiment, the magnet arrays 74A, 74B have pole faces of opposite polarity directly facing opposite side legs 93A, 93B of the primary coil array 64. With the design illustrated in FIG. 2C, current passing through the first side leg 93A of the primary coil array 64 in one direction generates the first primary force 204A in a transverse direction that is substantially perpendicular to the direction of the current passing through the first side leg 93A. The first primary force 204A can include a first X primary component 204Ax and a first Y primary component 204Ay. The first X primary component 204Ax is substantially parallel to an X axis (illustrated in FIG. 2C), and the first Y primary component 204Ay is substantially parallel to a Y axis (illustrated in FIG. 2C).

In addition, current passing through the second side leg 93B of the primary coil array 64 in the opposing direction generates the second primary force 204B in a transverse direction that is also substantially perpendicular to the direction of the current passing through the second side leg 93B. The second primary force 204B can include a second X primary component 204Bx and a second Y primary component 204By. The sum of the first and second primary forces 204A, 204B is the net primary force, which is substantially parallel to the Y axis. Additionally, the sum of the first and second primary forces 204A, 204B produces the net primary force, which has little or no force component in a direction parallel to the X axis. With this design, the net primary force generated by the first current 200 through the primary coil array 64 causes (i) rotation of the actuator assembly 50 about the actuator pivot center 42 and (ii) a first rotational displacement $X_{R1}$ (not shown) of the data transducer 56.

The side legs 93A, 93B of the primary coil array 64 are oriented lengthwise substantially toward the actuator pivot center 42, which is also referred to herein as a radial direction. Because of the orientation of the side legs 93A, 93B, and the orientation and positioning of the magnet arrays 74A, 74B, the first and second primary forces 204A, 204B each can have a relatively small force vector (not shown) in the radial direction. In the embodiment illustrated in FIG. 2C, the force vectors of the first and second primary forces 204A, 204B in the radial direction are approximately zero.

Further, in the embodiment illustrated in FIG. 2C, the magnitude of each Y primary component 204Ay, 204By is greater than the magnitude of each X primary component 204Ax, 204Bx. In alternate embodiments, the magnitude of each of the Y primary components 204Ay, 204By is at least approximately 10 percent, 50 percent, 100 percent, 200 percent, 500 percent or 1,000 percent greater than the magnitude of each of the X primary components 204Ax, 204Bx of the primary forces 204A, 204B, respectively.

The secondary coil array 66, when energized, allows greater accuracy of the disk drive 10 during reading and or writing operations. More specifically, the second current 202 in the secondary coil array 66 causes a first secondary force 206A (illustrated as an arrow) between the energized first coil segment 94 of the secondary coil array 66 and the magnet assembly 60. Additionally, the second current 202 in the secondary coil array 66 causes a second secondary force 206B (illustrated as an arrow) between the energized second coil segment 96 of the secondary coil array 66 and the magnet assembly 60. The sum of the first secondary force 206A and the second secondary force 206B is the net secondary force (not shown). The magnitude and direction of the first and second secondary forces 206A, 206B, and thus the net secondary force, depends upon the shape of the secondary coil array 66, the design of the magnet assembly 60 and the amplitude, direction and frequency of the second current 202 that is directed through the secondary coil array 66. It is recognized that the amplitude, direction and frequency of the second current 200 can be adjusted as required to produce the desired magnitude and direction of the net secondary force.

In this embodiment, the magnet arrays 74A, 74B have pole faces of opposite polarity directly facing the first coil segment 94 and the second coil segment 96 of the secondary coil array 66. With the design illustrated in FIG. 2C, current passing through the first coil segment 94 of the secondary coil array 66 generates the first secondary force 206A in a radial direction relative to the actuator pivot center 42. The first secondary force 206A can include a first X secondary component 206Ax and a first Y secondary component 206Ay. The first X secondary component 206Ax is substantially parallel to the X axis, and the first Y secondary component 206Ay is substantially parallel to the Y axis.

Further, current passing through the second coil segment 96 of the secondary coil array 66 generates the second secondary force 206B in a radial direction relative to the actuator pivot center 42. The second secondary force 206B can include a second X secondary component 206Bx and a second Y secondary component 206By. The sum of the first and second secondary forces 206A, 206B is the net secondary force, which is substantially parallel to the Y axis. Additionally, the sum of the first and second secondary forces 206A, 206B produces the net secondary force, which has little or no force component in a direction parallel to the X axis. Thus, the net secondary force generated by the second current 202 through the secondary coil array 66 causes (i) a relatively small rotation of the actuator assembly 50 about the actuator pivot center 42 and (ii) a relatively small second rotational displacement $X_{R2}$ (not shown) of the data transducer 56.

The control system 18 directs the first current 200 to the primary coil array 64 and the second current 202 to the secondary coil array 66 to position the data transducer 56. It should be noted that when current is directed to both coil arrays 64, 66, the primary force 204 is summed with the secondary force 206 to yield a net force on the actuator pivot center. Because the primary force 204 causes a first rotational displacement $X_{R1}$, and the secondary force 206 can cause a second rotational displacement $X_{R2}$, current directed to both coil arrays 64, 66, results in a net rotational displacement of the data transducer 56. Stated another way, the first rotational displacement $X_{R1}$ is summed with the second rotational displacement $X_{R2}$ to result in a net rotational displacement of the data transducer 56. The net rotational displacement of the data transducer 56 is used to position, and maintain the position, of the data transducer 56 relative to the target track of the storage disk (illustrated in FIG. 1).

Because of the configuration and positioning of the secondary coil array 66 relative to the primary coil array 64, the secondary coil array 66 is not required to generate a magnitude of the second rotational displacement $X_{R2}$ that is similar to the first rotational displacement $X_{R1}$. For example, in one embodiment, the absolute value of the ratio of the first rotational displacement $X_{R1}$ to the second rotational displacement $X_{R2}$ is greater than approximately 1.5:1. In alternate embodiments, the absolute value of the ratio of the first rotational displacement $X_{R1}$ to the second rotational displacement $X_{R2}$ is greater than approximately 2:1, 5:1, 10:1, 50:1, 100:1 or 200:1. With this design, the second rotational displacement $X_{R2}$ only offsets the first rotational displacement $X_{R1}$, if at all, to a relatively small degree. Therefore, the coil arrays 64, 66 can both be driven with relatively low levels of current because of the disparity between the first rotational displacement $X_{R1}$ and the second rotational displacement $X_{R2}$. With this design, less power is required during operation of the disk drive 10. A lower power requirement can translate into a higher signal to noise ratio.

As provided herein, the coil segments 94, 96 of the secondary coil array 66 are oriented lengthwise in a direction substantially perpendicular to the direction of the corresponding secondary forces 206A, 206B (indicated by dashed lines 210). Because of the orientation of the coil segments 94, 96, and the orientation and positioning of the magnet arrays 74A, 74B, the first and second secondary forces 206A, 206B each have a relatively large force vector in the radial direction relative to the actuator pivot center 42. In one embodiment, the radial force vector of the first secondary force 206A can be approximately equal to the first secondary force 206A. Somewhat similarly, the radial force vector of the second secondary force 206B can be approximately equal to the second secondary force 206B.

Moreover, the radial force vectors of the secondary coil array 66 can be substantially greater than the radial force vectors of the primary coil array 64. For example, in alternate embodiments, the radial force vectors of the secondary coil array 66 can be approximately 10 percent, 50 percent, 100 percent, 500 percent, 1,000 percent, 5,000 percent or 10,000 percent greater than the radial force vectors of the primary coil array 64. However, these percentages are only representative examples of various embodiments and are not intended to limit the scope of the invention in any manner.

Further, in the embodiment illustrated in FIG. 2C, the magnitude of the sum of the Y secondary components 206Ay, 206By is greater than the magnitude of the sum of the X secondary components 206Ax, 206Bx. In alternate embodiments, the magnitude of the sum of the Y secondary components 206Ay, 206By is at least approximately 10 percent, 50 percent, 100 percent, 200 percent, 500 percent, 1,000 percent, 5,000 percent or 10,000 percent greater than the magnitude of the sum of the X secondary components 206Ax, 206Bx of the secondary forces 206A, 206B, respectively.

Because the actuator assembly 50 is not a completely rigid body, in the absence of the secondary force 206, the primary force 204 causes rapid, repetitive flexing of the actuator hub 34, the actuator shaft 36, the actuator arms 38 and the primary coil array 64. This flexing occurs at different frequencies of vibration, and can include a first vibration mode and a second vibration mode, as examples. Without the secondary force 206 acting on the actuator assembly 50, the vibration modes caused by activation of the primary coil array 64 can give rise to an undesirable vibratory movement of the data transducer 56, also referred to herein as a first vibration displacement $X_{V1}$ The first vibration displacement $X_{V1}$ is basically a measurement of the amplitude of the vibratory movement of the data transducer that is caused by primary force. The first vibration displacement $X_{V1}$ can result in difficulty in maintaining the data transducer 56 on track during track following.

Moreover, in the absence of the primary force 204, the secondary force 206 can also cause a rapid, repetitive flexing of the actuator hub 34, the actuator shaft 36 and the actuator arms 38. This flexing can occur at different frequencies of vibration, and can result in an undesirable vibratory movement of the data transducer 56, also referred to herein as a second vibration displacement $X_{V2}$ The second vibration displacement $X_{V2}$ is essentially a measurement of the amplitude of the vibratory movement of the data transducer that is caused by secondary force.

The positioner 24 provided herein controls the second vibration displacement $X_{V2}$ in order to partially or completely offset the first vibration displacement $X_{V1}$ caused by the primary force 204. For example, the second vibration displacement $X_{V2}$ can be out of phase with the first vibration displacement $X_{V1}$ in order to offset the first vibration displacement $X_{V1}$. In one embodiment, the second vibration displacement $X_{V2}$ is approximately 180 degrees out of phase with the first vibration displacement $X_{V1}$. In an alternate embodiment, the second vibration displacement $X_{V2}$ is at least approximately 150 degrees and less than approximately 210 degrees out of phase with the first vibration displacement $X_{V1}$. In still an alternate embodiment, the second vibration displacement $X_{V2}$ is greater than approximately 90 degrees and less than 270 degrees out of phase with the first vibration displacement $X_{V1}$.

The sum of the first vibration displacement $X_{V1}$ and the second vibration displacement $X_{V2}$ is referred to herein as the net vibration displacement of the data transducer 56. In one embodiment, the absolute value of the net vibration displacement is less than the absolute value of the first vibration displacement $X_{V1}$. In alternate embodiments, the absolute value of the net vibration displacement is less than approximately 75 percent, 50 percent, 20 percent, 10 percent, 5 percent or 1 percent of the absolute value of the first vibration displacement $X_{V1}$. In still an alternative embodiment, the net vibration displacement of the data transducer is approximately zero. The control system 18 directs current to the coil arrays 64, 66 to control the net vibration displacement of the data transducer 56. In one embodiment, the control system 18 directs the second current 202 to the second coil array 66 so that the second vibration displacement $X_{V2}$ is substantially opposite from the first vibration displacement $X_{V1}$. Stated another way, the second current 202 directed to the secondary coil array 66 can be out of phase from the first current 200 that is directed to the primary coil array 64. In one embodiment, the second current 202 is approximately 180 degrees out of phase from the first current 200. In alternate embodiments, the second current 202 can be less than or greater than 180 degrees out of phase from the first current 200. For example, by controlling the amplitude, frequency and or direction of the current, or altering the shape and or positioning of the secondary coil array 66, the second current 202 can be between approximately 90 and 270 degrees, or between 135 and 225 degrees out of phase from the first current 200, as non-exclusive examples.

Further, the control system 18 directs the second current 200 to the secondary coil array 66 so that the magnitude of the second vibration displacement $X_{V2}$ is approximately equal to the magnitude of the first vibration displacement $X_{V1}$. This can be accomplished by controlling the second current 200 so that the amplitude of the second vibration displacement $X_{V2}$ generated by the energized second coil array 66 is approximately equal in magnitude to and opposite from the amplitude of the first vibration displacement $X_{V1}$ generated by the energized first coil array 64. In this embodiment, the second vibration displacement $X_{V2}$ at least partially, if not fully, offsets or counteracts the first vibration displacement $X_{V1}$ caused by the one or more vibration modes.

In alternate embodiments, the control system 18 directs second current 202 to the secondary coil array 66 and the first current 200 to the first coil array 64 so that the magnitude of the second vibration displacement $X_{V2}$ is at least approximately 20 percent, 50 percent, 75 percent, 90 percent, 110 percent, 125 percent, 150 percent or 200 percent of the magnitude of the first vibration displacement $XV_1$. As a result, the second vibration displacement $X_{V2}$, at least partially offsets or counteracts the vibration modes caused by the first vibration displacement $X_{V1}$.

The control system 18 can utilize one or more closed feedback loops to continually adjust the amplitude of the currents 200, 202 that are directed to each coil array 64, 66 by each of the controllers 33A, 33B, to maintain the relative position of the data transducer 56. With this design, the control system 18 can adjust the amplitude and frequency of the current 200, 202 directed to each coil array 64, 66 in order to optimize the desired extent of offset or cancellation of the first vibration displacement $X_{V1}$ with the second vibration displacement $X_{V2}$.

At alternative times during operation of the disk drive 10, the amplitude of the first current 200 can be at least approximately 1 percent, 10 percent, 100 percent, 1,000 percent, or 10,000 percent of the amplitude of the second current 202. At still alternative times, the amplitude of the first current 200 can be adjusted to be greater or less than the foregoing percentages.

Although utilization of the secondary coil array 66 is most effective during either track following or settling mode (immediately prior to track following), the secondary coil array 66 can also be effectively used during a seek mode (e.g. random access) of the disk drive 10.

Figure 3A:
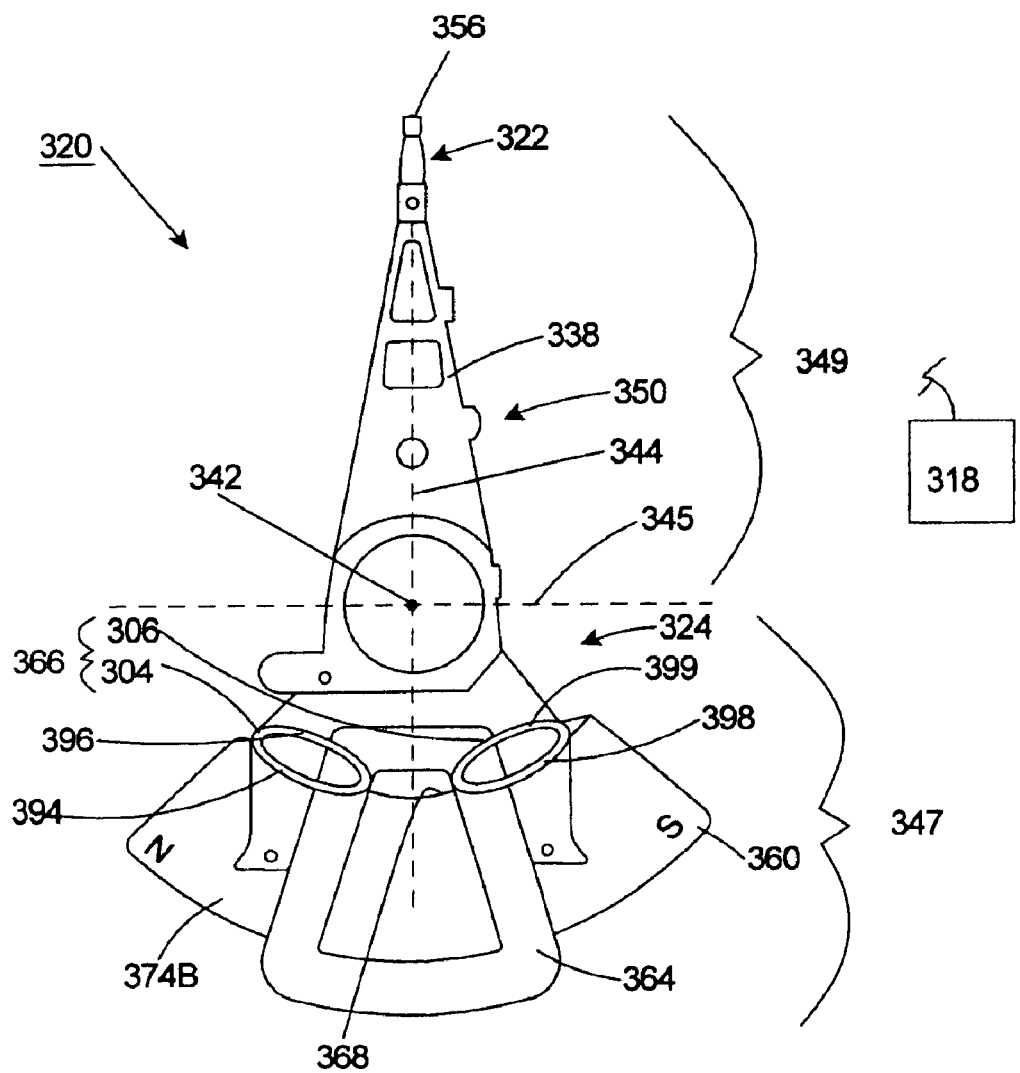
FIG. 3A is a top view of a head stack assembly including a portion of another embodiment of the positioner.

FIG. 3A illustrates a partial top view of another embodiment of a head stack assembly 320 and a control system 318.

In this embodiment, the head stack assembly 320 includes (i) an actuator assembly 350 having an actuator pivot center 342, (il) a data transducer 356, and (iii) a positioner 324 including a magnet assembly 360, a primary coil array 364, and a secondary coil array 366. In this embodiment, the actuator assembly 350, the data transducer 356, the magnet assembly 360, and the primary coil array 364 are similar to the corresponding components described above. Further, the control system 318 can direct current to the coil arrays 364, 366 in a similar fashion as described above. However, in this embodiment, the secondary coil array 366 has an alternate design.

FIG. 3A illustrates that the head stack assembly 320 also has a longitudinal axis 344 and a latitudinal axis 345 that is perpendicular to the longitudinal axis 344. The latitudinal axis 345 intersects the longitudinal axis 344 at the actuator pivot center 342. The latitudinal axis 345 divides the head stack assembly 320 into two general regions, (i) a positioner region 347, and (ii) a transducer region 349. The positioner region 347 generally includes the positioner 324. The transducer region 349 includes one or more actuator arms 338 and one or more transducer assemblies 322.

In this embodiment, the secondary coil array 366 includes a first coil 304 and a spaced apart second coil 306. Alternatively, more than the two coils 304, 306, can be incorporated into the secondary coil array 366. The configuration of the coils 304, 306, can vary. The coils 304, 306, illustrated in FIG. 3A are generally oval-shaped, although other suitable geometric configurations can be used.

The coils 304, 306, can be positioned symmetrically about the longitudinal axis 344 of the head stack assembly 320 so that the first coil 304 is on an opposite side of the longitudinal axis 344 from the second coil 306. Moreover, as illustrated in FIG. 3A, the coils 304, 306, are positioned entirely within the positioner region 347 of the head stack assembly 320. In an alternative embodiment, the coils 304, 306, are positioned so that a majority of at least one of the coils 304, 306 is within the positioner region 347 of the head stack assembly 320. Still alternatively, the coils 304, 306 can be positioned so that a majority of each coil 304, 306 is within the positioner region 347.

In this embodiment, the first coil 304 includes a first coil segment 394 connected to a first connector segment 396. In the embodiment illustrated in FIG. 3A, the first coil segment 394 is generally arc-shaped and is positioned directly between the first magnet array (not shown for clarity) and the second magnet array 374B, thereby enhancing interaction between the coil segments 394 and the magnet assembly 360. Somewhat similarly, the second coil 306 includes the second coil segment 398 connected to the second connector segment 399. The second coil segment 398 can also be generally arc-shaped and is also positioned directly between the first magnet array and the second magnet array 374B. The specific configuration of the coil segments 394, 398 can vary, however. For example, the coil segments can be linear, curved, angled, or can have any other suitable shape. FIG. 3A illustrates that the coil segments 394, 398 can generally follow a contour of an inner edge 368 of the magnet assembly 360, although this shape is not specifically required. Moreover, the coil segments 394, 398 can remain substantially between the first magnet array and the second magnet array 374B during positioning of the data transducer 356 between the inner diameter and outer diameter of the storage disk 16 (illustrated in FIG. 1). Further, the coil segments 394, 398 do not cross the pole transition zone 382 (illustrated in FIG. 3B) during movement of the coil arrays 364, 366 between the magnet arrays, i.e. during positioning of the data transducer 356 between the inner diameter and the outer diameter of the storage disk 16. This design, in conjunction with the configuration of the secondary coil array 366 provided herein, promotes a consistent secondary force throughout the stroke of the positioner 324 during track following or settling operations of the disk drive 10.

The second current directed through the secondary coil array 366 generates a secondary force on the actuator assembly 350 that is generally radial relative to the actuator pivot center 342. The actual radial direction of the secondary force can generally be either radially inward or radially outward, depending upon the position of the secondary coil array 366 relative to the magnet arrays 374B and the direction of the current in the secondary coil array 366. In one embodiment, the secondary force is almost exactly radially directed. However, in other embodiments, the secondary force may not be exactly radially directed.

The control system 318 can direct current to each coil 304, 306 independently or in a concerted manner. For example, the control system 318 can direct current to the first coil 304 in the same direction as the second coil 306. Alternatively, the control system 318 can reverse the direction of current to one of the coils 304, 306. Still alternately, the control system 318 can alter the amplitude of current to the coils 304, 306. Moreover, as provided herein, the control system can direct current to the coils 304, 306 that is in phase or out of phase in order to control the effect of the secondary force of the secondary coil array 366.

Figure 3B:
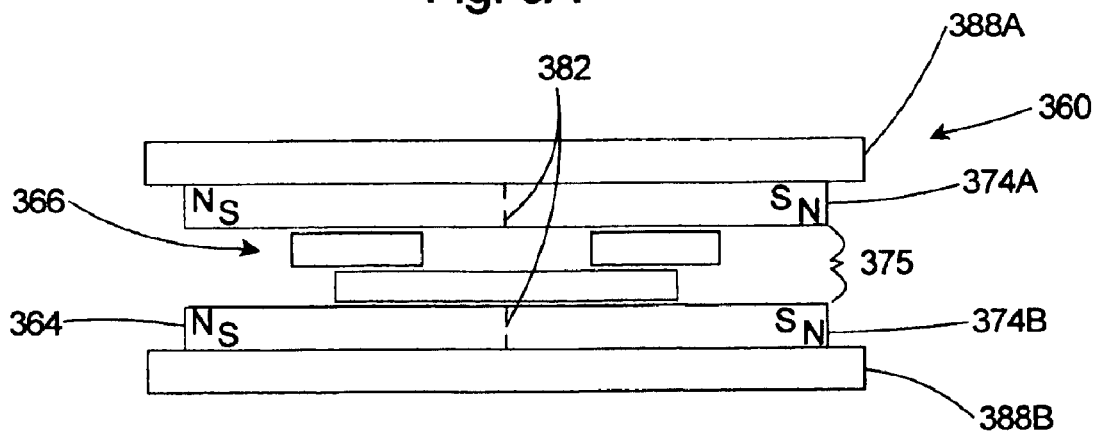
FIG. 3B is a partial end view of the embodiment of the positioner illustrated in FIG. 3A.

FIG. 3B illustrates a side view of a portion of the positioner 324, including the magnet assembly 360, the primary coil array 464 and the secondary coil array 366 of FIG. 3A. The magnet assembly 360 includes the magnet arrays 374A, 374B and the flux return plates 388A, 388B. Further, the magnet assembly includes a pole transition zone 382. FIG. 3B also illustrates that at least a portion of the primary coil array 364 and a portion of the secondary coil array 366 are positioned in a fluid gap 375 between the magnet arrays 374A, 374B. In FIG. 3B the coil arrays 364, 366 are positioned in substantially parallel planes and the primary coil array 364 is positioned below the secondary coil array 366. Alternately, the positioning of the coil arrays 364, 366 can be varied. For example, the primary coil array 364 could be positioned above the secondary coil array 366, or the secondary coil array 366 can be positioned above and or below the primary coil array 364.

Figure 4A:
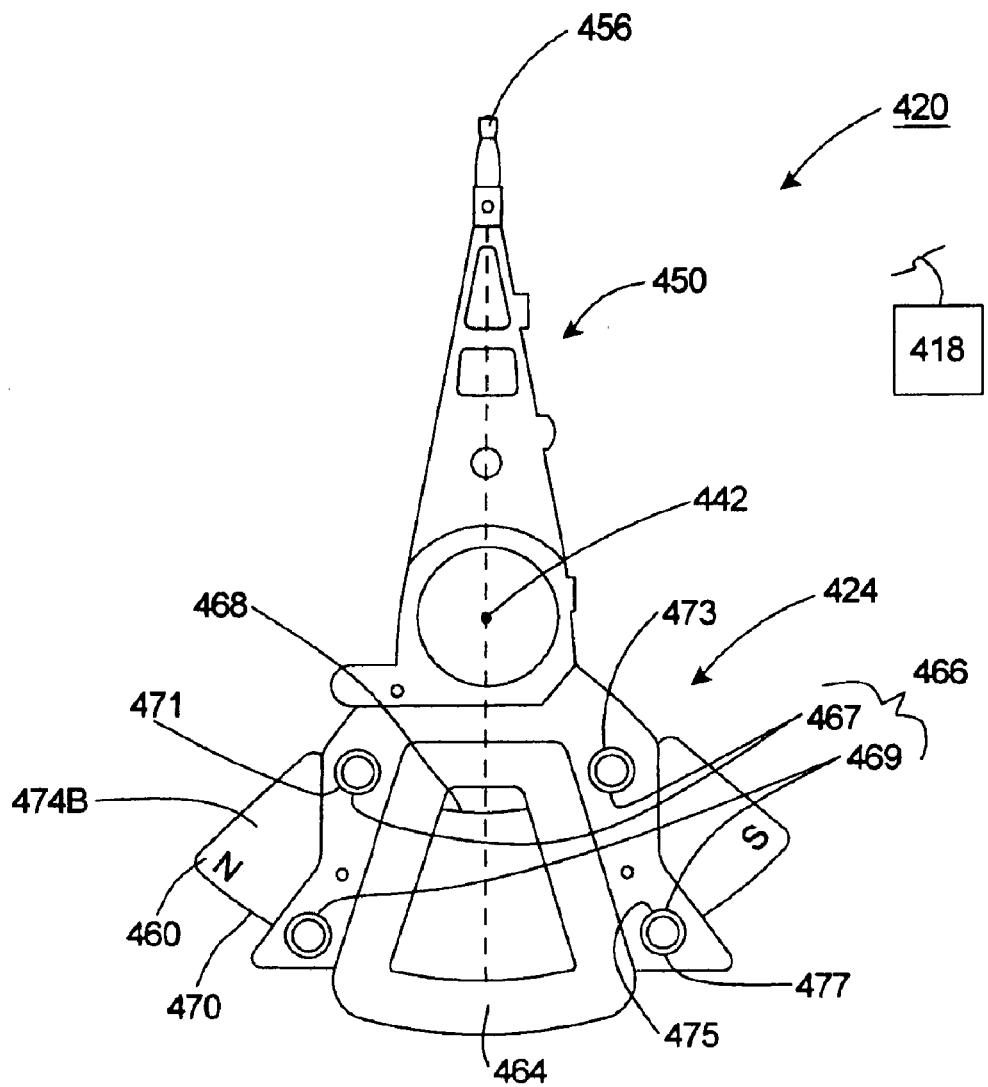
FIG. 4A is a top view of a head stack assembly including a portion of yet another embodiment of the positioner.

FIG. 4A illustrates a partial top view of another embodiment of a head stack assembly 420 and a control system 418. In this embodiment, the head stack assembly 420 includes (i) an actuator assembly 450 having an actuator pivot center 442, (ii) a data transducer 456, and (iii) a positioner 424 including a magnet assembly 460, a primary coil array 464, and a secondary coil array 466. In this embodiment, the actuator assembly 450, the data transducer 456, the magnet assembly 460, and the primary coil array 464 are similar to the corresponding components described above. Further, the control system 418 can direct current to the coil arrays 464, 466 in a similar fashion as described above. However, in this embodiment, the secondary coil array 466 has an alternate design.

In FIG. 4A, the secondary coil array 466 can include one or more proximal coils 467 positioned near an inner edge 468 of the magnet assembly 460 and or one or more distal coils 469 positioned near an outer edge 470 of the magnet assembly 460.

In this embodiment, the proximal coils 467 each have an arc-shaped proximal coil segment 471 that is positioned directly between the first magnet array (not shown in FIG. 4A), and the second magnet array 474B. Further, each proximal coil 467 includes a proximal connector segment 473 that is not positioned directly between the magnet arrays. Further, the distal coils 469 each have an arc-shaped distal coil segment 475 that is positioned directly between the magnet arrays. Further, each distal coil 469 includes a distal connector segment 477 that is not positioned directly between the magnet arrays. Although the coils 467, 469 shown in FIG. 4A are substantially circular, the geometric shape of each coil 467, 469 can vary. Moreover, the coil segments 471, 473 can remain substantially between the first magnet array and the second magnet array 374B during positioning of the data transducer 456 between the inner diameter and outer diameter of the storage disk 16 (illustrated in FIG. 1). Further, the coil segments 471, 473 do not cross the pole transition zone 482 (illustrated in FIG. 4B) during movement of the coil arrays 464, 466 between the magnet arrays, i.e. during positioning of the data transducer 456 between the inner diameter and the outer diameter of the storage disk 16. This design, in conjunction with the configuration of the secondary coil array 466 provided herein, promotes a consistent secondary force throughout the stroke of the positioner 424 during track following or settling operations of the disk drive 10.

The second current directed through the secondary coil array 466 generates a secondary force on the actuator assembly 450 that is generally radial to the actuator pivot center 442. The actual radial direction of the secondary force can be either generally radially inward or generally radially outward, depending-upon the position of the secondary coil array 466 relative to the magnet arrays and the direction of the current in the secondary coil array 466.

The control system 418 can direct current to each of the coils 467, 469 independently or in a concerted manner. For example, the control system 418 can direct current to the proximal coils 467 in the same direction as the distal coils 469. Alternatively, the control system 418 can reverse the direction of current to one or more of the coils 467, 469. Still alternately, the control system 418 can alter the amplitude of current to one or more of the coils 467, 469. Moreover, the control system 418 can direct current to one or more of the coils 467, 469 that is in phase or out of phase with the remaining coils 467, 469 in order to control the effect of the secondary force of the secondary coil array 466. In one embodiment, the secondary force is almost exactly radially directed at the actuator pivot center 442. However, in other embodiments, the secondary force may not be exactly radially directed.

Figure 4B:
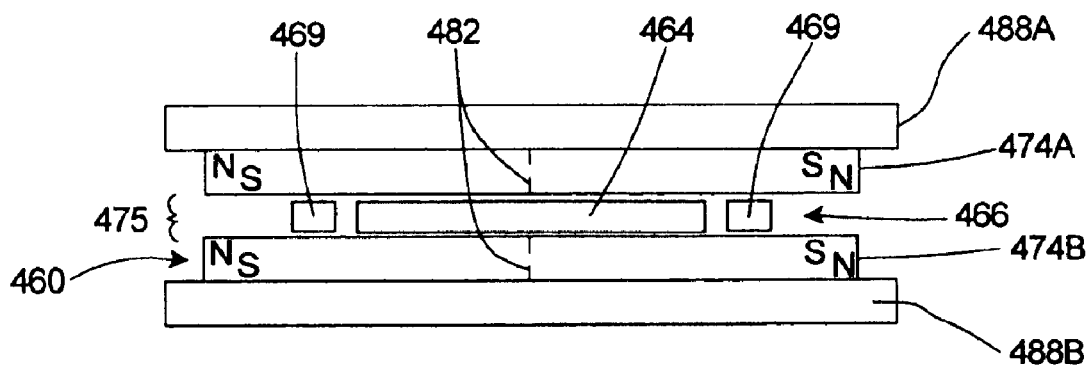
FIG. 4B is a partial end view of the embodiment of the positioner illustrated in FIG. 4A.

FIG. 4B illustrates a side view of a portion of the positioner 424 including the magnet assembly 460, the primary coil array 464 and the distal coils 469 of the secondary coil array 466 of FIG. 4A. The magnet assembly 460 includes the magnet arrays 474A, 474B and the flux return plates 488A, 488B. The magnet assembly 460 also includes the pole transition zone 482. At least a portion of the primary coil array 564 and a portion of the secondary coil array 466 are positioned in a fluid gap 475 between the magnet arrays 474A, 474B. The proximal coils 467 (illustrated in FIG. 4A), and or the distal coils 469 can have a similar thickness to the primary coil array 464. Alternatively, the proximal coils 467 and the distal coils 469 can have a different thickness than the primary coil array 464. The proximal coils 467 and or the distal coils 469 can be positioned substantially coplanar with the primary coil array 464. With this design, the secondary coil array 466 would not require any additional spacing within the magnet assembly 460 beyond that of a conventional magnet assembly. Alternatively, the coil arrays 464, 466 can be positioned in substantially parallel planes, e.g. the coil arrays 464, 466 can be non-coplanar.

Figure 5:
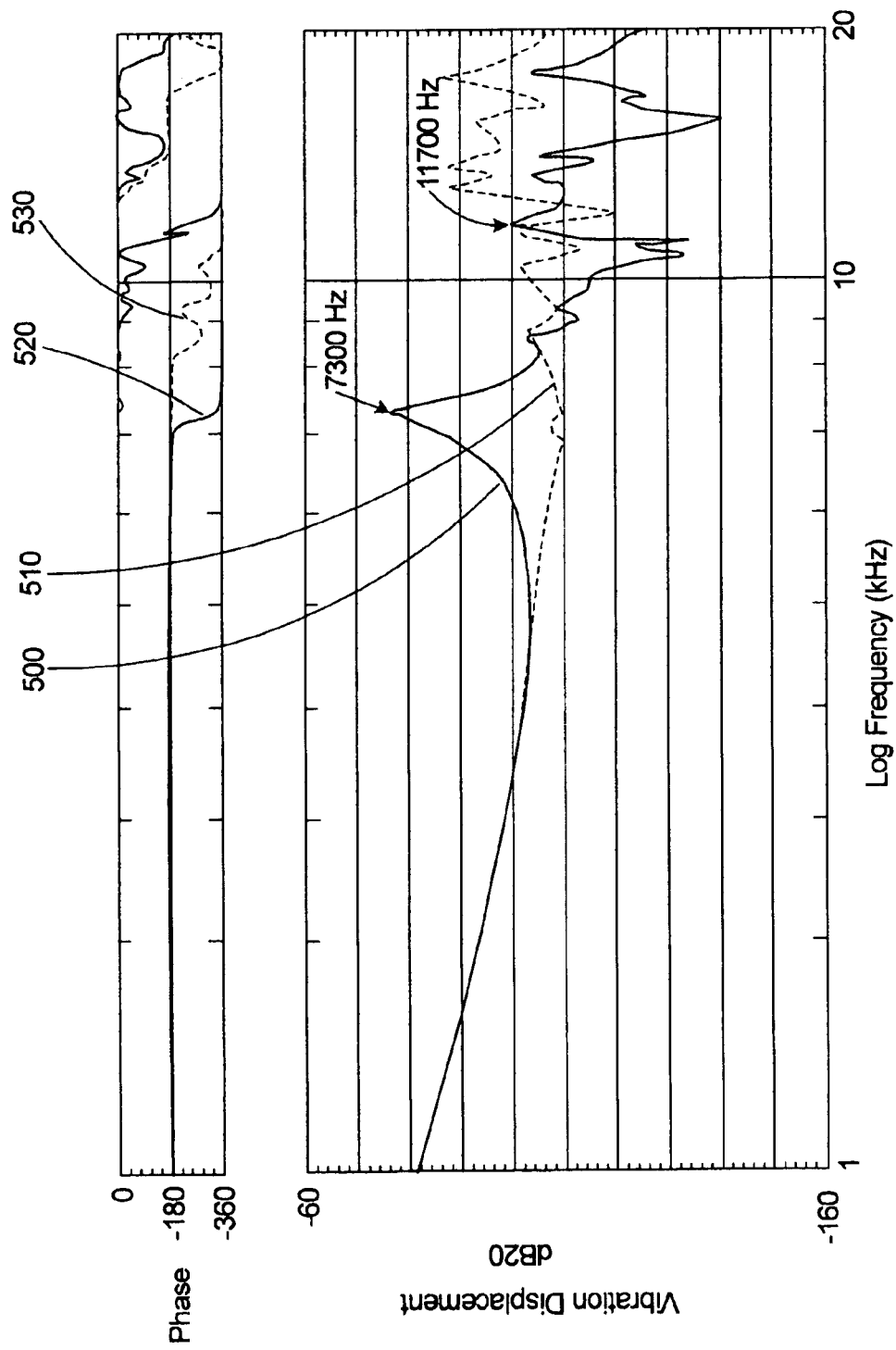
FIG. 5 is a graph of simulated results of vibration displacement in a disk drive plotted against frequency in a disk drive that includes a positioner having features of the present invention.

FIG. 5 is a graphical representation of the vibration displacement plotted as a function of the excitation frequency, as determined by finite element analysis for one example of track following. In FIG. 5, the solid line 500 depicts the vibration displacements at are generated by the first current through a primary coil array, without the second current through the secondary coil array. The primary coil array alone generates a relatively large amplitude at 7,300 Hertz and at 11,700 Hertz. The peak at approximately 7,300 Hertz is due to the resonance of the first vibration mode and the peak at approximately 11,700 Hertz is due to the response of the second vibration mode. The dashed line 510 depicts the resulting vibration displacements that are experienced by the data transducer when both the primary and the secondary coil arrays are activated, thereby generating the primary force and the secondary force. Line 510 illustrates a relatively small vibration displacement at 7,300 Hertz and 11,700 Hertz, which reflects at least a partial cancellation or offset of the vibration displacements generated by the primary coil array at those frequencies.

FIG. 5 also includes a graphical representation of the phase of the data transducer 56 relative to the input current plotted as a function the excitation frequency as determined by finite element analysis. The curve for the primary coil array (indicated by solid line 520) illustrates a phase shift of approximately 180 degrees at approximately 7,300 Hertz, which corresponds to a resonance of the first vibration mode of the actuator assembly. The curve for the primary coil array plus the secondary coil array (indicated by dashed line 530) illustrates that this 180 degree phase change now occurs at a higher frequency closer to approximately 11,000 Hz. Having this phase change occur at a higher frequency allows the actuator assembly to be controlled with greater accuracy. Further, the gain of the servo system can be increased and disturbances can be rejected by a higher ratio. Consequently, track density can be increased allowing for greater storage capacity.

While the particular positioner 24 and disk drive 10 as herein shown and disclosed in detail are fully capable of attaining the objectives and providing the advantages herein before stated, it is to be understood that they are merely illustrative of the presently preferred embodiments of the invention and that no limitations are intended to the details of construction or design herein shown other than as described in the appended claims.

What is claimed is:

1. A disk drive comprising:
    a drive housing;
    a storage disk that is coupled to the drive housing, the storage disk including a storage surface having an inner diameter and an outer diameter; and
    a head stack assembly coupled to the drive housing, the head stack assembly including (i) a data transducer that is moved between the inner diameter and the outer diameter near the storage surface, (ii) an actuator pivot center, (iii) a longitudinal axis, (iv) a latitudinal axis that is substantially perpendicular to the longitudinal axis, the latitudinal axis intersecting the longitudinal axis at the actuator pivot center, the latitudinal axis dividing the head stack assembly into a transducer region that includes the data transducer and a positioner region, and (v) a positioner that causes movement of the data transducer, the positioner including a magnet array that generates a magnetic field, a primary coil array that interacts with the magnetic field to generate a primary force, and a secondary coil array positioned substantially within the positioner region, the secondary coil array interacting with the magnetic field to generate a secondary force having a net force component in a direction parallel to the longitudinal axis that remains substantially constant when the data transducer moves between the inner diameter and the outer diameter of the storage disk.

2. The disk drive of claim 1, wherein the net force component in a direction parallel to the longitudinal axis is approximately zero.

3. The disk drive of claim 1 wherein the primary force has a net force component in a direction parallel to the longitudinal axis that remains substantially constant while the data transducer is moved between the inner diameter and the outer diameter of the storage disk.

4. The disk drive of claim 3, wherein the sum of the net force components of the primary force and the secondary force in a direction parallel to the longitudinal axis is approximately zero while the data transducer is moved between the inner diameter and the outer diameter of the storage disk.

5. The disk drive of claim 1 wherein the primary force causes a first rotational displacement of the data transducer, and wherein the secondary force causes a second rotational displacement of the data transducer, wherein the absolute value of the ratio of the first rotational displacement to the second rotational displacement is at least approximately 1.5:1.

6. The disk drive of claim 1 wherein the primary force causes a first rotational displacement of the data transducer, and wherein the secondary force causes a second rotational displacement of the data transducer, wherein the absolute value of the ratio of the first rotational displacement to the second rotational displacement is at least approximately 5:1.

7. The disk drive of claim 1 wherein the secondary coil array includes exactly one coil.

8. The disk drive of claim 1 wherein the secondary coil array includes a proximal coil and a distal coil, the proximal coil being positioned closer to the actuator pivot center than the distal coil.

9. The disk drive of claim 1, wherein the secondary coil array includes two proximal coils and two distal coils, each proximal coil being positioned closer to the actuator pivot center than each distal coil.

10. A method for increasing the accuracy of maintaining a data transducer on track in a disk drive having a storage disk and a head stack assembly that includes an actuator pivot center and a longitudinal axis, the method comprising the steps of:
    directing a first current to a primary coil array to generate a first rotational displacement of the data transducer relative to the storage disk;
    directing a second current to a secondary coil array to generate a second rotational displacement of the data transducer relative to the storage disk so that the absolute value of the ratio of the first rotational displacement to the second rotational displacement is at least approximately 1.5:1; and
    adjusting the second current to counteract at least a portion of a first vibration displacement that is generated by the primary coil array with a second vibration displacement that is generated by the secondary coil array so that the absolute value of the sum of the first and second vibration displacements is less than the absolute value of the first vibration displacement.

11. The method of claim 10 wherein the step of directing a second current includes directing the second current to the second coil array so that the absolute value of the ratio of the first rotational displacement to the second rotational displacement is at least approximately 5:1.

12. The method of claim 10 wherein the step of adjusting the second current includes causing the second vibration displacement to be approximately 180 degrees out of phase with the first vibration displacement.

13. The method of claim 10 wherein the step of directing a second current includes the second current being greater than approximately 90 degrees and less than approximately 270 degrees out of phase from the first current.

14. The method of claim 10 wherein the step of directing a second current includes the second current being approximately 180 degrees out of phase from the first current.

15. The method of claim 10 wherein the step of directing a second current includes providing a secondary coil array having a proximal coil and a distal coil, the proximal coil being closer to the actuator pivot center than the distal coil.

16. The method of claim 10 wherein the steps of directing a first current and directing a second current includes generating no net force in a direction that is substantially parallel to the longitudinal axis.

17. A disk drive, comprising:

a drive housing; and a head stack assembly coupled to the drive housing, the head stack assembly including longitudinal axis, a data transducer, and a positioner that is coupled to the data transducer, the positioner including (i) a magnet assembly that generates a magnetic field, (ii) a primary coil array that interacts with the magnetic field and generates a first rotational displacement of the data transducer, the primary coil array generating a primary force having a radial component that is directed substantially radially relative to the actuator pivot center, and (iii) a secondary coil array interacts with the magnetic field and generates a second rotational displacement of the data transducer, the secondary coil array including force, the force of each coil segment including a radial component that is directed substantially radially relative to the actuator pivot center, wherein a magnitude of at least one of the redial component of the secondary force is greater than a magnitude of the ratio of the first rotational primary force, and wherein the absolute value of the ratio of the first rotational displacement to the second rotational displacement is at least approximately 1.5:1.

18. The disk drive of claim 17 wherein the magnitude of at least one of the radial components of the secondary force is at least 200 percent greater than the magnitude of the radial component of the primary force.

19. The disk drive of claim 17 wherein the magnitude of at least one of the radial components of the secondary force is at least 1,000 percent greater than the magnitude of the radial component of the primary force.

20. A disk drive, comprising:

a drive housing; and a head stack assembly coupled to the drive housing, the head stack assembly including an actuator pivot center, a data transducer, and a positioner that positions the data transducer, the positioner including (i) a magnet assembly that generates a magnetic field, (ii) a primary coil that interacts with the magnetic field and generates a primary force having a radial component that is directed substantially radially relative to the actuator pivot center, and (iii) a secondary coil array that interacts with the magnetic field, the secondary coil array including a plurality of coil segments that generate forces that combine to generate a secondary force, the force generated by each coil segment including a radial component that is directed substantially radially relative to the actuator pivot center, wherein a magnitude of at least one of the radial components of the secondary force is greater than a magnitude of the radial component of the primary force.

21. The disk drive of claim 20 wherein the radial component of the primary force is approximately zero.

22. A disk drive, comprising:

a drive housing; and a head stack assembly coupled to the drive housing, the head stack assembly including a data transducer and a positioner that is coupled to the data transducer, the positioner including (i) a magnet assembly that generates a magnetic field, the magnet assembly including a first magnet array and a spaced apart second magnet array, each magnet array having an inner edge, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1, wherein the secondary coil array includes a first coil segment and a spaced apart second coil segment, the coil segments being positioned directly between the magnet arrays, at least one of the coil segments being shaped substantially similar to at least a portion of the inner edge of at least one of the magnet arrays.

23. A disk drive, comprising:

a drive housing; and a head stack assembly coupled to the drive housing, the head stack assembly including an actuator pivot center, a data transducer, and a positioner that is coupled to the data transducer, the positioner including (i) a magnet assembly that generates a magnetic field, the magnet assembly including a first magnet array and a spaced apart second magnet array, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1, wherein the secondary coil array includes a first coil segment and a spaced apart second coil segment, the coil segments being positioned directly between the magnet arrays, the first and second coil segments each forming arcs of a circle having a center positioned approximately at the actuator pivot center.

24. A disk drive, comprising:

a drive housing; and a head stack assembly coupled to the drive housing, the head stack assembly including a longitudinal axis, a data transducer and a positioner that is coupled to the data transducer, the positioner including (i) a magnet assembly that generates a magnetic field, the magnet assembly including a first magnet array and a spaced apart second magnet array, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1, wherein the secondary coil array includes a first coil having a first coil segment, and a spaced apart second coil having a second coil segment, the coil segments being positioned directly between the magnet arrays.

25. The disk drive of claim 24 wherein the absolute value of the ratio of the first rotational displacement to the second rotational displacement is at least approximately 2:1.

26. The disk drive of claim 24 wherein the first and second coils are positioned on opposite sides of the longitudinal axis, and wherein the first and second coils are substantially symmetrical relative to the longitudinal axis.

27. The disk drive of claim 24 wherein the head stack assembly includes actuator pivot center, and wherein the secondary coil array includes at least one coil segment that generates a secondary force is directed substantially radially relative to the actuator pivot center.

28. A disk drive, comprising:
a drive housing; and
a head stack assembly coupled to the drive housing, the head stack assembly including an actuator pivot center, a data transducer, and a positioner that is coupled to the data transducer, the positioner including (i) a magnet assembly that generates a magnetic field, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1, wherein the secondary coil array includes a proximal coil and a distal coil, the proximal coil being positioned closer to the actuator pivot center than the distal coil.

29. The disk drive of claim 28 wherein the absolute value of the ratio of the first rotational displacement to the second rotational displacement is at least approximately 5:1.

30. A disk drive, comprising:
a drive housing; and
a head stack assembly coupled to the drive housing, the head stack assembly including an actuator pivot center, a data transducer, and a positioner that is coupled to the data transducer, the positioner including (i) a magnet assembly that generates a magnetic field, (ii) a primary coil array that interacts with the magnetic field and generates a first rotational displacement of the data transducer, and (iii) a secondary coil array that interacts with the magnetic field and generates a second rotational displacement of the data transducer; wherein the absolute value of the ratio of the first rotational displacement to the second rotational displacement is at least approximately 1.5:1, wherein the secondary coil array includes two proximal coils and two distal coils, each proximal coil being positioned closer to the actuator pivot center than each distal coil.

31. The disk drive of claim 30 wherein the absolute value of the ratio of the first rotational displacement to the second rotational displacement is at least approximately 5:1.

32. A disk drive, comprising:
a drive housing; and
a head stack assembly coupled to the drive housing, the head stack assembly including a longitudinal axis, an actuator pivot center, a data transducer, and a positioner that is coupled to the data transducer, the positioner including (i) a magnet assembly that generates a magnetic field, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1, wherein the secondary coil array includes at least one coil segment that generates a secondary force directed substantially radially relative to the actuator pivot center.

33. The disk drive of claim 32 wherein the absolute value of the ratio of the first rotational displacement to the second rotational displacement is at least approximately 5:1.

34. The disk drive of claim 32 wherein the secondary coil array includes exactly one coil.

35. The disk drive of claim 32 wherein the primary coil array generates a first vibration displacement that causes the data transducer to move off track, and the secondary coil array generates a second vibration displacement that at least partially counteracts the first vibration displacement.

36. The disk drive of claim 35 wherein the second vibration displacement is out of phase from the first vibration displacement.

37. The disk drive of claim 35 wherein the second vibration displacement is approximately 180 degrees out of phase from the first vibration displacement.

38. The disk drive of claim 32 wherein the first and second coil segments are positioned on opposite sides of the longitudinal axis, and are substantially symmetrical relative to the longitudinal axis.

39. The disk drive of claim 32 wherein the head stack assembly includes an actuator pivot center, and wherein the secondary coil array includes a proximal coil and a distal coil, the proximal coil being positioned closer to the actuator pivot center than the distal coil.

40. The disk drive of claim 39 wherein the magnet assembly includes a first magnet array and a spaced apart second magnet array, and wherein only a portion of at least one of the coils is positioned directly between the magnet arrays.

41. The disk drive of claim 39 wherein the magnet assembly includes a first magnet array and a spaced apart second magnet array, and wherein only a portion of each of the coils is positioned directly between the magnet arrays.

42. The disk drive of claim 32 wherein the head stack assembly includes an actuator pivot center, and wherein the secondary coil array includes two proximal coils and two distal coils, each proximal coil being positioned closer to the actuator pivot center than each distal coil.

43. The disk drive of claim 42 wherein the magnet assembly includes a first magnet array and a spaced apart second magnet array, and wherein only a portion of at least one of the coils is positioned directly between the magnet arrays.

44. The disk drive of claim 42 wherein the magnet assembly includes a first magnet array and a spaced apart second magnet array, and wherein only a portion of each of the coils is positioned directly between the magnet arrays.

45. The disk drive of claim 42 wherein the proximal coils and the distal coils are positioned substantially symmetrical relative to the longitudinal axis.

46. The disk drive of claim 32 wherein the primary coil array and the secondary coil array are substantially coplanar.

47. The disk drive of claim 32 wherein the primary coil array and the secondary coil array are not coplanar.

48. The disk drive of claim 32 wherein the head stack assembly includes (i) an actuator pivot center, and (ii) a latitudinal axis that is substantially perpendicular to the longitudinal axis, the latitudinal axis intersecting the longitudinal axis at the actuator pivot center, the latitudinal axis separating the head stack assembly into a positioner region that includes the positioner, and a transducer region that includes the data transducer, and wherein the secondary coil array is positioned substantially within the positioner region of the head stack assembly.

49. The disk drive of claim 48 further comprising a storage disk having an inner diameter and an outer diameter, wherein the positioner moves the data transducer between the inner diameter and the outer diameter, and wherein the primary coil array generates a primary force and the secondary coil array generates a secondary force, the forces combining to generate approximately no net force in a direction that is substantially parallel to the longitudinal axis of the head stack assembly.

50. The disk drive of claim 32 wherein the head stack assembly includes (i) an actuator pivot center, and (ii) a latitudinal axis that is substantially perpendicular to the longitudinal axis, the latitudinal axis intersecting the longitudinal axis at the actuator pivot center, the latitudinal axis separating the head stack assembly into a positioner region that includes the positioner, and a transducer region that includes the data transducer, and wherein the secondary coil array is positioned entirely within the positioner region of the head stack assembly.

51. The disk drive of claim 32 further comprising a storage disk having an inner diameter and an outer diameter, wherein the positioner moves the data transducer between the inner diameter and the outer diameter, and and wherein the secondary coil array generates a secondary force having approximately no net force in a direction substantially parallel to the longitudinal axis of the head stack assembly when the data transducer is positioned near one of the inner diameter or the outer diameter.

52. The disk drive of claim 32 further comprising a storage disk having an inner diameter and an outer diameter, wherein the positioner moves the data transducer between the inner diameter and the outer diameter, and wherein the primary coil array generates a primary force and the secondary coil array generates a secondary force, the forces combining to generate approximately no net force in a direction substantially parallel to the longitudinal axis of the head stack assembly when the data transducer is positioned near one of the inner diameter or the outer diameter.

53. A disk drive, comprising:

a drive housing;

a storage disk coupled to the drive housing, the storage disk having an inner diameter and an outer diameter; and a head stack assembly coupled to the drive housing, the head stack assembly including a longitudinal axis, a data transducer, and a positioner that is coupled to the data transducer, the positioner including (i) a magnet assembly that generates a magnetic field, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1; wherein the positioner moves the data transducer between the inner diameter and the outer diameter, and wherein the secondary coil array generates a secondary force having approximately no net force in a direction substantially parallel to the longitudinal axis of the head stack assembly when the data transducer is positioned near one of the inner diameter and the outer diameter.

54. A disk drive, comprising:

a drive housing;

a storage disk coupled to the drive housing, the storage disk having an inner diameter and an outer diameter; and a head stack assembly coupled to the drive housing, the head stack assembly including a longitudinal axis, a data transducer, and a positioner that is coupled to the data transducer, the positioner including (i) a magnet assembly that generates a magnetic field, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1; wherein the positioner moves the data transducer between the inner diameter and the outer diameter, and wherein the primary coil array generates a primary force and the secondary coil array generates a secondary force, the forces combining to generate approximately no net force in a direction substantially parallel to the longitudinal axis of the head stack assembly when the data transducer is positioned near one of the inner diameter and the outer diameter.

55. A disk drive, comprising:

a drive housing; and a head stack assembly coupled to the drive housing, the head stack assembly including a longitudinal axis, a data transducer, and a positioner that is coupled to the data transducer, the positioner including (i) a magnet assembly that generates a magnetic field, the magnet assembly has a pole transition zone positioned approximately at a midpoint of the magnet assembly, (ii) a primary coil array that interacts with the magnetic field and generates a first rotational displacement of the data transducer, and (iii) a secondary coil array that interacts with the magnetic field and generates a second rotational displacement of the data transducer, the absolute value of the ratio of the first rotational displacement to the second rotational displacement being at least approximately 1.5:1; wherein the secondary coil array is at a middle position when the secondary coil array is substantially symmetrical relative to the pole transition zone, and wherein the secondary coil array generates a secondary force having no net force in a direction substantially parallel to the longitudinal axis when the secondary coil array is positioned away from the middle position.

56. A method for increasing the accuracy of maintaining a data transducer on track in a disk drive having a storage disk and a head stack assembly that includes an actuator pivot center and a longitudinal axis, the method comprising the steps of:

directing a first current to a primary coil array to generate a first rotational displacement of the data transducer relative to the storage disk;

providing a secondary coil array having a proximal coil and a distal coil, the proximal coil being closer to the actuator pivot center than the distal coil; and directing a second current to the secondary coil array to generate a second rotational displacement of the data transducer relative to the storage disk so that the absolute value of the ratio of the first rotational displacement to the second rotational displacement is at least approximately 1.5:1.

57. A method for increasing the accuracy of maintaining a data transducer on track in a disk drive having a storage disk and a head stack assembly that includes an actuator pivot center and a longitudinal axis, the method comprising the steps of:

directing a first current to a primary coil array to generate a first rotational displacement of the data transducer relative to the storage disk; and directing a second current to a secondary coil array to generate a second rotational displacement of the data transducer relative to the storage disk so that the absolute value of the ratio of the first rotational displacement to the second rotational displacement is at least approximately 1.5:1;

wherein the steps of directing a first current and directing a second current include generating no net force in a direction that is substantially parallel to the longitudinal axis.

58. A disk drive, comprising:

a drive housing; and a head stack assembly coupled to the drive housing, the head stack assembly including longitudinal axis, a data transducer, and a positioner that is coupled to the data transducer, the positioner including (i) a magnet assembly that generates a magnetic field, (ii) a primary coil array that interacts with the magnetic field and generates a first rotational displacement and a first vibration displacement of the data transducer, the first vibration displacement causing the data transducer to move off-track, and (iii) a secondary coil array that interacts with the magnetic field and generates a second rotational displacement and a second vibration displacement of the data transducer, the second vibration displacement at least partially counteracting the first vibration displacement; wherein the absolute value of the ratio of the first rotational displacement to the second rotational displacement is at least approximately 1.5:1, and wherein the absolute value of the sum of the first and second vibration displacements is less than the absolute value of the first vibration displacement.

59. A disk drive, comprising:

a drive housing; and a head stack assembly coupled to the drive housing, the head stack assembly including longitudinal axis, a data transducer, and a positioner that is coupled to the data transducer, the positioner including (i) a magnet assembly that generates a magnetic field, (ii) a primary coil array that interacts with the magnetic field and generates a first rotational displacement and a first vibration displacement of the data transducer, the first vibration displacement causing the data transducer to move off-track, and (iii) a secondary coil array that interacts with the magnetic field and generates a second rotational displacement and a second vibration displacement of the data transducer, the second vibration displacement at least partially counteracting the first vibration displacement; wherein the absolute value of the ratio of the first rotational displacement to the second rotational displacement is at least approximately 1.5:1, and wherein the absolute value of the sum of the first and second vibration displacements is approximately zero.

* * * * *

UNITED STATES PATENT AND TRADEMARK OFFICE
CERTIFICATE OF CORRECTION

PATENT NO. : 6,922,301 B1
DATED : July 26, 2005
INVENTOR(S) : Wittig et al.

It is certified that error appears in the above-identified patent and that said Letters Patent is hereby corrected as shown below:

Column 17,
Line 39, before the word "interacts", please insert -- that --.
Line 42, after the word "including", please insert -- a plurality of coil segments that generate forces that combine to generate a secondary --.
Lines 45-46, please delete "redial component", and substitute therefor -- radial components --.
Line 47, after "magnitude of the", please insert -- radial component of the --.
Line 47, please delete the phrase "ratio of the first rotational".

Column 21,
Line 37, before "wherein", please delete the word "and".

Signed and Sealed this

Twenty-seventh Day of September, 2005

JON W. DUDAS
*Director of the United States Patent and Trademark Office*